(12) United States Patent
Rikoski

(10) Patent No.: US 8,374,054 B1
(45) Date of Patent: Feb. 12, 2013

(54) APPARATUS AND METHOD FOR GRAZING ANGLE INDEPENDENT SIGNAL DETECTION

(75) Inventor: Richard J. Rikoski, Alameda, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 450 days.

(21) Appl. No.: 12/802,454

(22) Filed: May 17, 2010

Related U.S. Application Data

(60) Provisional application No. 61/216,566, filed on May 18, 2009.

(51) Int. Cl.
 *G01S 15/00* (2006.01)
(52) U.S. Cl. .......................................................... 367/88
(58) Field of Classification Search ............... 367/88; 342/147
 See application file for complete search history.

(56) References Cited

U.S. PATENT DOCUMENTS

| | | | | |
|---|---|---|---|---|
| 3,484,737 A * | 12/1969 | Walsh | | 367/88 |
| 4,232,380 A * | 11/1980 | Caron et al. | | 367/88 |
| 4,445,186 A * | 4/1984 | Caron et al. | | 367/88 |
| 4,939,698 A * | 7/1990 | Murphree | | 367/88 |
| 5,177,710 A * | 1/1993 | Gilmour et al. | | 367/88 |
| 5,506,812 A * | 4/1996 | Zehner | | 367/88 |
| 5,973,634 A * | 10/1999 | Kare | | 342/25 A |
| 8,159,387 B1 * | 4/2012 | Fernandez et al. | | 342/146 |
| 8,213,740 B1 * | 7/2012 | Rikoski | | 367/88 |
| 2009/0179790 A1 * | 7/2009 | Jahangir | | 367/88 |

* cited by examiner

*Primary Examiner* — Daniel Pihulic
(74) *Attorney, Agent, or Firm* — James T. Shepherd

(57) ABSTRACT

An apparatus and method for relating echoes from a surface or object produced by irradiation, such as by sonar or radar, from different grazing angles according to the relationship:

$$f_s = \frac{cf_x}{2\cos\theta}$$

where $f_x$ is the spatial frequency corresponding to the size of the surface or object, $\theta$ the grazing angle, and $f_s$ the temporal frequency. In this manner one can relate to one another echoes from the same surface or object generated at different grazing angles, permitting good correlation between the echoes.

8 Claims, 3 Drawing Sheets

APPARATUS AND METHOD FOR GRAZING ANGLE INDEPENDENT SIGNAL DETECTION

CLAIM OF PRIORITY

This application has the priority of U.S. Provisional Patent Application Ser. No. 61/216,566, filed May 18, 2009.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

A basic function of radiative systems such as sonar or radar is to reliably correlate echoes received from an object scanned from different locations. This permits identification, classification, or imaging of objects or surfaces, examples of which might be, in a marine environment, sea shells, pebbles, rocks, shoals, patches of seafloor, terrain, naval mines, undersea pipes or cables, or sunken vessels. Unfortunately, echo signature varies with the angle of incidence, or grazing angle, at which the object is scanned, which means that echoes received back from the same object at different grazing angles will correlate poorly. In particular, increasing grazing angle progressively foreshortens the apparent size of an object along the line of sight between the sonar/radar generator and the object. This in turn changes the frequency of radiation necessary to duplicate the signature of the object, requiring different frequencies for different grazing angles.

SUMMARY OF THE INVENTION

Accordingly, an object of the invention is to permit good correlation between echoes returned at different grazing angles.

Another object is to permit a priori identification of the bandwidth necessary to recognize all physical objects of a given size at a given set of grazing angles.

Another object is to permit mapping of the spectrum of an echo from one surface at one grazing angle to the corresponding spectrum for that echo at a second grazing angle, to permit good correlation with a pre-existing echo from the same surface at the second grazing angle.

In accordance with these and other objects made apparent hereinafter, the invention concerns an apparatus and method in which a surface or object is irradiated at a known grazing angle so as to produce detectable echoes. The spectrum detected at one grazing angle is related to a corresponding spectrum for the echo at second grazing angle by the relationship:

$$f_s = \frac{cf_x}{2\cos\theta}$$

Where $f_x$ is the spatial frequency in a plane tangent to the surface, $\theta$ the second grazing angle, and $f_s$ is the signal frequency that can detect/image the surface or object at angle $\theta$ and spatial frequency $f_x$. This relationship permits one to design a sonar, radar, or the like, having the correct bandwidth to detect/image surfaces or objects within a preselected range of spatial frequencies over a preselected range of grazing angles. Similarly, if one has a pre-existing data base of echoes returned from a given surface at one grazing angle, one can use the above relation to correct echoes received at another grazing angle, to permit meaningful comparisons with the pre-existing data base.

These and other objects are further understood from the following detailed description of particular embodiments of the invention. It is understood, however, that the invention is capable of extended application beyond the precise details of these embodiments. Changes and modifications can be made to the embodiments that do not affect the spirit of the invention, nor exceed its scope, as expressed in the appended claims. The embodiments are described with particular reference to the accompanying drawings, wherein:

DETAILED DESCRIPTION

Figure 1:
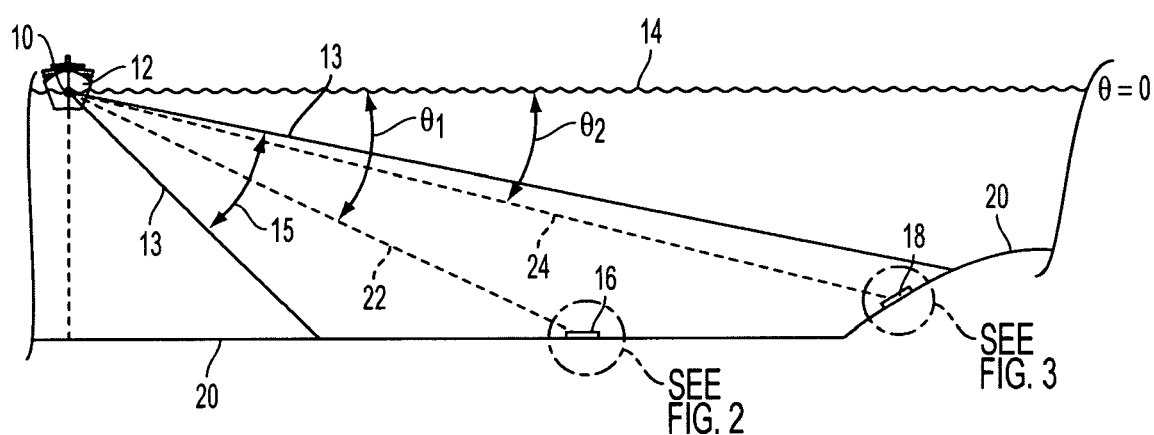
FIG. 1 is a plan view of an embodiment of the invention.

With reference to the drawing figures, wherein like numbers indicate like parts throughout the several views, FIG. 1 shows an embodiment of the invention employing sonar. A side scanning sonar 10 is mounted on ship 12 disposed on marine surface 14 above bottom 20, and generates a broad beam sonar signal 13 of azimuthal width 15. Beam 20 irradiates a broad swath of bottom 20 with a pulse of known spectral content, and receives back echoes, here in the form of complex pressure intensities, from bottom 20 and preferably records the echoes, for example by digitally sampling the echoes and recording the samples on a digital storage device for processing. Included among these echoes are returns from patches 16, 18 of bottom 20, which have respective lines of sight 22, 24 to sonar 10 at azimuthal angles $\theta_1$ and $\theta_2$. As illustrated in FIG. 1, bottom patches 16, 18 are at different distances from sonar 20, and at different orientations, i.e. different grazing angles, thereto. These patches can be any radiative feature on bottom 20, for example pebbles, sea shells, a sandy bottom, or (in the case of patch 18) a reef or shoal extending from bottom 20.

Figure 2:
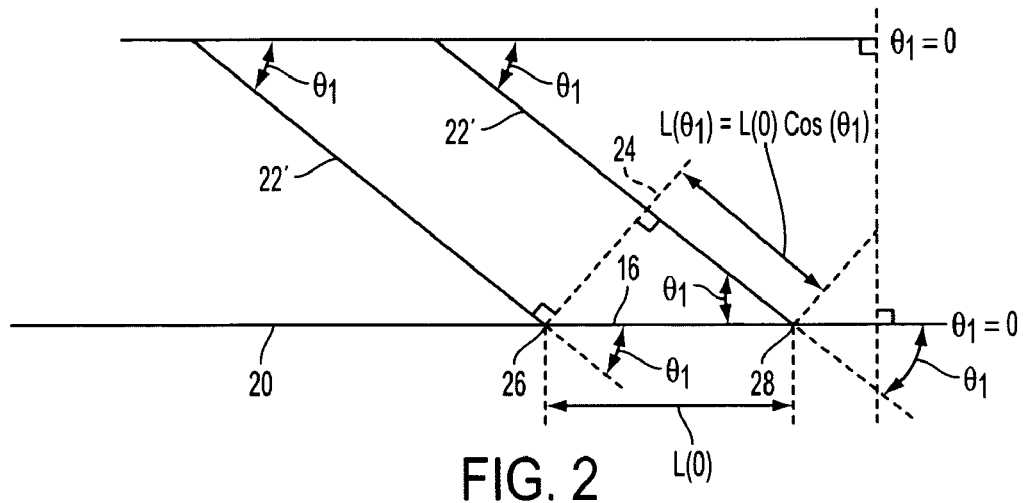
FIG. 2 is a detail of an encircled portion of FIG. 1, denominated as such in FIG. 1.

FIG. 2 illustrates how grazing angle affects the correlation of echoes received from the same sonar scatterer at different grazing angles. Bottom patch 16 is sufficiently far from sonar 10 that the pressure signal generated by sonar 10 arrives at patch 16 for practical purposes as a plane wave with a flat wavefront 24 over a distance corresponding to the resolution of the sonar. Because sonar 10 is at angle $\theta_1$ with respect to patch 16, the pulse's wavefront reaches, and reflects from, one end 26 of bottom patch 16 and then reflects continuously across the length of patch 16 until reaching opposite end 28. FIG. 2 illustrates bottom patch 16 as lying horizontally and being of a length L(0). This nomenclature indicates that patch 16 has a length of L, which would be its apparent length as viewed from sonar 10 if patch 16 were disposed horizontally (grazing angle $\theta_1=0$), or, more generally, perpendicular to wavefront 24. Because $\theta_1$ is between zero and ninety degrees, the apparent length of patch 16 as viewed from sonar 10 is foreshortened, i.e. $L(\theta_1) \leq L(0)$. This compresses the length of the echo reflected from patch 16, changing thereby its spectral content, with the consequence that it will correlate poorly with an uncompressed version of the same echo. One can see this quantitatively as follows:

For two points at respective distances $R_1$ and $R_2$ from a radiator such as sonar 10, the difference $\Delta t$ in round trip times of radiation to and from the two points is:

$$\Delta t = 2(R_1 - R_2)/c$$

where c is signal velocity, here the speed of sound in water; for radar, the speed of light in free space. In FIG. 2, the round trip difference between echoes received at sonar 10 from opposite ends 26, 28 of bottom patch 16 is the distance wavefront 24 travels after it hits end 26 until it hits end 28, i.e.:

$$\Delta t = 2L(0)\text{Cos}(\theta_1)/c$$

Any sinusoidal signal of frequency $f_s$ and wavelength $\lambda$ obeys the relationship:

$$c = f_s \lambda$$

where $\lambda$ is signal wavelength. To produce an echo capable of characterizing the sea floor at spatial frequency $f_x$ or wavelength $\lambda_x$, one must irradiate the sea floor with a signal containing wavelength $\lambda$, which for the embodiment of FIGS. 1 and 2 is:

$$\lambda = \frac{c}{f_s} = 2\lambda_x \text{Cos}(\theta_1)$$

One can express sea floor wavelength $\lambda_x$ as a spatial frequency $f_x$:

$$f_x = \frac{1}{\lambda_x}$$

Substituting spatial frequency $f_x$ for $\lambda$, and solving for $f_s$:

$$f_s = \frac{cf_x(0)}{2\text{Cos}(\theta_1)}$$

Or, alternatively:

$$f_x = \frac{2\text{Cos}(\theta_1)f_s(0)}{c}$$

This means that in order to characterize the sea floor at spatial frequency $f_x$ and at a grazing angle $\theta_1$, one must irradiate the sea floor with a signal whose spectrum contains temporal frequency $f_s$, or, alternatively, if a temporal frequency $f_s(0)$ can characterize the sea floor at $\theta=0$ incidence, at $\theta_1$ incidence one needs a spectrum containing at least one spatial frequency $f_x(\theta)$.

Figure 3:
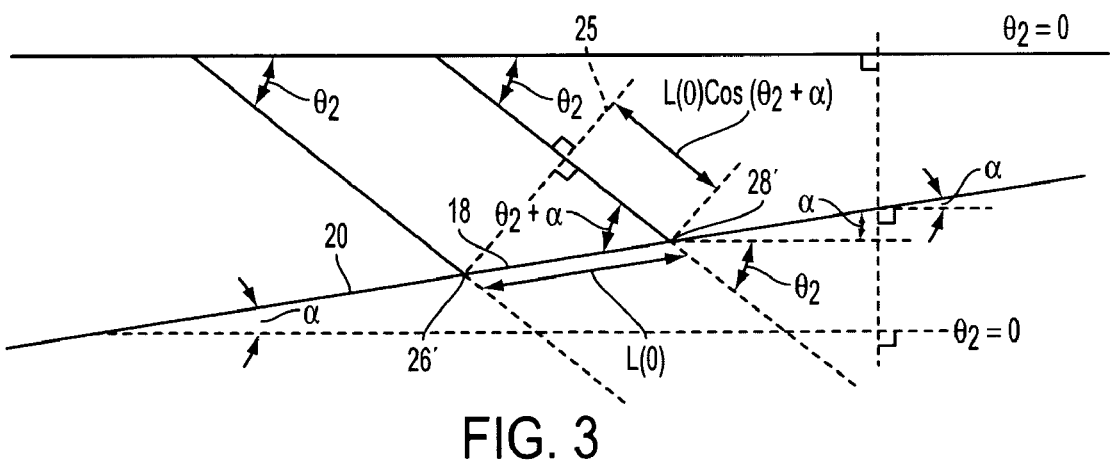
FIG. 3 is a detail of another encircled portion of FIG. 1, denominated as such in FIG. 1.

In FIG. 3, bottom 20 slopes at an angle $\alpha$ to horizontal, and has a bottom patch extending between points 26' and 28' and of dimension $L(0)$. Wavefront 25 first strikes the patch at 26' when wavefront 25 is still a distance $L(0)\text{Cos}(\theta_2+\alpha)$ from opposite end 28', as seen in the diagram in FIG. 3, making the effective grazing angle $\theta_2+\alpha$, in contrast to the grazing angle of $\theta_1$ in FIG. 2.

From the foregoing, one can see that a knowledge of grazing angle permits a user aboard ship 12 to correct echo signatures returned from an artifact on bottom 20 at different grazing angles so that the echoes will correlate well. This in turn permits a wide range of applications. For example, survey data describing the contour of a marine bottom is frequently available and storable in a computer aboard ship 12. Ship 12 can then send out a broadbeam sonar pulse 13, and record the echoes returned from bottom 20 as a function of time, typically by digitally sampling the echoes and storing the samples in computer memory. This permits formation of a reference data base that relates echo signature to both locations on bottom 20 as well as grazing angle. A later ship that similarly scans bottom 20, albeit from a different location and hence different grazing angles, can use the knowledge of its own position to correct the echoes it receives back for differences in grazing angle from the reference data base. One simple way to do this is to use the above equations to transform the spectrum of an echo of interest as follows:

$$f_{s2} = f_{s1}\frac{\text{Cos}(\theta_1)}{\text{Cos}(\theta_2)}$$

Or, alternatively, because $f_s = cf_x(0)/2\text{cos}(\theta)$:

$$f_{x2}(0) = f_{x1}(0)$$

Where $f_{s2}$ is the temporal frequency at grazing angle $\theta_2$ corresponding to temporal frequency $f_{s1}$ at grazing angle $\theta_1$, and $f_{x2}$ and $f_{x1}$ are the spatial frequencies corresponding to $f_{s2}$ and $f_{s1}$. This permits good correlation of echoes returned from bottom artifacts such as bottom patches 16 or 18 (or other artifacts, such as shoals, rocks, naval mines, sunken vessels, etc.). This also suggests that one can design a sonar for an expected range of grazing angles. If, for example, one knows a priori the minimum and maximum azimuthal angles $\theta$ that a particular sonar would scan, the minimum and maximum angles a that a marine bottom of interest would have, and the minimum and maximum spatial frequency $f_x$ of bottom artifacts of interest, one can then specify the necessary sonar bandwidth, i.e.:

$$\frac{cf_{x,min}}{2\text{Cos}\theta_{min}} \leq f_s \leq \frac{cf_{x,max}}{2\text{Cos}\theta_{max}}$$

Where $\theta$ is effective grazing angle, i.e. azimuthal angle plus bottom slope $\alpha$.

In practice, a large range of vehicles could advantageously use the foregoing scheme, for example autonomous underwater vehicles (AUVs), or submarines or other submersibles. So too could unmanned aerial vehicles (UAVs), or airplanes, helicopters, or spacecraft with radars like that currently on the Space Shuttle or satellites.

Figure 4:
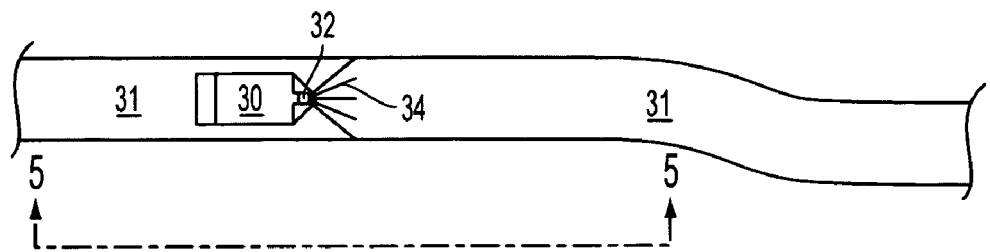
FIG. 4 is a plan view of another embodiment of the invention.
Figure 5:
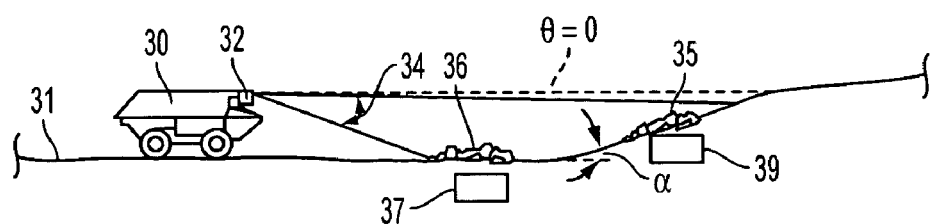
FIG. 5 is a view in the direction of lines 5-5 of FIG. 4.

FIGS. 4 and 5 show an embodiment of the invention employing radar, rather than sonar, the purpose of which is to identify potential locations of improvised explosive devices (IEDs). Vehicle 30, such as an armored personnel carrier, having a front scanning radar 32 with beamwidth 34 travels along road 31, which has IEDs 37 and 39 buried under respective overburdens of ground 36, 35. Vehicle 30 has on board a computer (not shown), or is in communication with a computer, that has a pre-existing radar data base that relates echo signature of road 31 and surroundings to position and grazing angle. In the same manner as above described for the sonar application, radar 32 has a bandwidth selected to encompass a preselected range of azimuthal angles, and a range of grade angles a known to encompass the range of grades along road 31. As vehicle 30 travels along road 31, radar 32 constantly scans the road ahead and surroundings, receiving echoes therefrom. The computer uses the (preferably GPS determined) location of vehicle 31 to correct in real time the grazing angles of the echoes for differences with the grazing angles of the existing database. This permits good correlation, for all physical points along road 31, of echoes received back at radar 32 with corresponding echoes in the pre-existing data base. Burying an IED, such as at 36 or 35, disturbs overburden 36, 35, above the devices, changing their echo signatures, with the result that the echoes will correlate poorly with the corresponding echo signatures for the same points in the pre-existing data base, and hence be identifiable well before vehicle 30 comes in range of IEDs 37, 39. One can similarly apply this embodiment as a diagnostic for roads generally, for example to identify, classify, and catalog damage to asphalt or concrete road surfaces. This is commonly known as coherent change detection.

Figure 6:
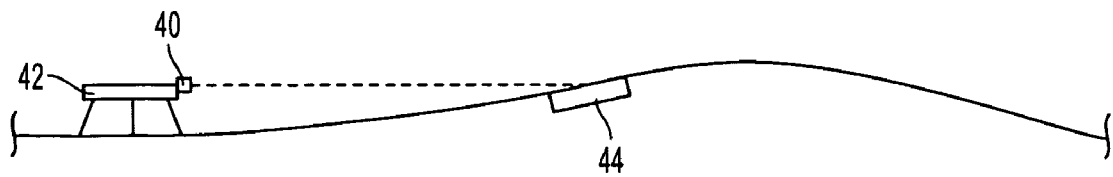
FIG. 6 is a plan view of another embodiment of the invention.

FIG. 6 shows an embodiment employing a microwave generator 40 disposed on platform 42, and irradiating a geologically active surface 44, e.g. an earthquake fault or the Yellowstone volcano caldera. As geologic activity warps surface 44, it ceases to correlate with earlier echoes, thus detecting the warping and identifying the activity. Because correlation is independent of grazing angle, one can move microwave generator 40 and platform 42 to different locations and still monitor the same surface 44. Correlating imagery from multiple passes by a scene at slightly different altitudes is commonly done to determine topology; this technique is a form of interferometry, and this embodiment allows for interferometry over substantially greater displacements.

In the foregoing embodiments, the natural reference for grazing angle θ=0 is the horizon. This, however, is a consequence of the particular applications of the embodiments. Ultimately, the selection of reference direction is arbitrary, so long as all subsequent measurements and data are referenced to the same 0=0 direction, or mapped thereto using the foregoing teachings.

The invention has been described in what is considered to be the most practical and preferred embodiments. It is recognized, however, that obvious modifications to these embodiments may occur to those with skill in this art. As an example, the foregoing discusses embodiments concerning sonar and radar, but the invention pertains to any radiation that can irradiate a surface so as to produce detectable returns. Accordingly, the scope of the invention is to be discerned from reference to the appended claims, wherein:

I claim:

1. A radiative scanner comprising:
   a signal generator disposed effective to propagate a signal; and
   a receiver disposed to receive echoes from said signal from a preselected range of effective grazing angles $\theta_{min} \leq \theta < \theta_{max}$;
   wherein the temporal bandwidth of said signal is at least:

$$\frac{cf_{x,min}}{2\cos\theta_{min}} \leq f_s \leq \frac{cf_{x,max}}{2\cos\theta_{max}}$$

Where $f_s$ is a temporal frequency in said bandwidth, c is the velocity of said signal, and $f_{x,min}$ and $f_{x,max}$ are respectively spatial frequencies within said bandwidth.

2. A radiative scanner comprising:
   a signal generator disposed effective to propagate a signal;
   a receiver disposed to receive echoes from said signal; and
   a processor effective to record, responsive to said receiver, the signatures of at least some of said echoes;
   wherein said processor is further adapted to associate in a database each of said at least some of said signatures with the respective effective grazing angle at which said signal produced said each of said at least some of said echoes.

3. A processor adapted to access a database, said database containing at least one echo signature associated in said database with an associated effective grazing angle; and
   wherein said processor is adapted for converting at least a portion of the spectrum of said at least one echo signature to a corresponding spectrum at a preselected different grazing angle.

4. The processor of claim 3, wherein said converting is done according to:

$$f_{s2} = f_{s1}\frac{\cos(\theta_1)}{\cos(\theta_2)}$$

where $f_{s1}$ is a temporal frequency in said at least a portion of the spectrum, $f_{s2}$ is the temporal frequency in said corresponding spectrum corresponding to $f_{s1}$, $\theta_1$ is said associated effective grazing angle, and $\theta_2$ is said preselected different grazing angle.

5. A method comprising:
   propagating a signal; and
   receiving echoes from said signal from a preselected range of effective grazing angles $\theta_{min} \leq \theta \leq \theta_{max}$;
   wherein the temporal bandwidth of said signal is at least:

$$\frac{cf_{x,min}}{2\cos\theta_{min}} \leq f_s \leq \frac{cf_{x,max}}{2\cos\theta_{max}}$$

and where $f_s$ is a temporal frequency in said bandwidth, c is the velocity of said signal, and $f_{x,min}$ and $f_{x,max}$ are in said bandwidth.

6. A method comprising:
   propagating a signal;
   receiving echoes from said signal;
   recording the signatures of at least some of said echoes; and
   associating in a database each of said at least some of said signatures with the respective effective grazing angle at which said signal produced said each of said at least some of said echoes.

7. A method comprising:
   accessing a database, said database containing at least one echo signature associated with an associated effective grazing angle; and
   converting at least a portion of the spectrum of said at least one echo signature to a corresponding spectrum at a preselected different grazing angle.

8. The method of claim 7, wherein said converting is done according to:

$$f_{s2} = f_{s1}\frac{\cos(\theta_1)}{\cos(\theta_2)}$$

where $f_{s1}$ is a temporal frequency in said at least a portion of the spectrum, $f_{s2}$ is the temporal frequency in said corresponding spectrum corresponding to $f_{s1}$, $\theta_1$ is said respective effective grazing angle, and $\theta_2$ is said preselected different grazing angle.

* * * * *